US012110073B2

(12) United States Patent
Sinclair, III

(10) Patent No.: US 12,110,073 B2
(45) Date of Patent: Oct. 8, 2024

(54) CITY WAGON

(71) Applicant: Frederick W. Sinclair, III, New Orleans, LA (US)

(72) Inventor: Frederick W. Sinclair, III, New Orleans, LA (US)

( * ) Notice: Subject to any disclaimer, the term of this patent is extended or adjusted under 35 U.S.C. 154(b) by 169 days.

(21) Appl. No.: 17/568,044

(22) Filed: Jan. 4, 2022

(65) Prior Publication Data

US 2022/0340219 A1 Oct. 27, 2022

Related U.S. Application Data

(60) Provisional application No. 63/134,915, filed on Jan. 7, 2021.

(51) Int. Cl.
*B62D 63/06* (2006.01)

(52) U.S. Cl.
CPC .................. *B62D 63/061* (2013.01)

(58) Field of Classification Search
CPC ..................................................... B62D 63/061
See application file for complete search history.

(56) References Cited

U.S. PATENT DOCUMENTS

| 2,818,272 | A | * | 12/1957 | De Lay | .................. | B62D 21/14 |
| | | | | | | 280/789 |
| 4,126,324 | A | * | 11/1978 | Browning | ............ | B62D 63/061 |
| | | | | | | 296/10 |
| 4,128,258 | A | * | 12/1978 | Johnson | ................. | B62D 21/14 |
| | | | | | | 280/46 |
| 4,662,650 | A | * | 5/1987 | Angehrn | ............. | B62D 33/044 |
| | | | | | | 280/789 |
| 5,042,831 | A | * | 8/1991 | Kuhns | .................... | B62D 21/14 |
| | | | | | | 280/786 |
| 5,775,711 | A | * | 7/1998 | Floe | ...................... | B62D 63/062 |
| | | | | | | 280/789 |
| 6,474,672 | B1 | * | 11/2002 | Briscese | .................. | B60G 3/00 |
| | | | | | | 280/43.23 |
| 6,485,054 | B1 | * | 11/2002 | Yurgevich | ............ | B62D 63/061 |
| | | | | | | 280/789 |
| 6,733,219 | B1 | * | 5/2004 | Floe | ....................... | B60D 1/065 |
| | | | | | | 296/57.1 |
| 6,773,025 | B1 | * | 8/2004 | Zelm | .................... | B62D 63/061 |
| | | | | | | 280/648 |

(Continued)

FOREIGN PATENT DOCUMENTS

WO       WO-9912800 A1 *    3/1999    ........... B62D 63/061

*Primary Examiner* — Jacob B Meyer

(74) *Attorney, Agent, or Firm* — Taylor M. Norton; Norton IP Law Firm

(57) ABSTRACT

A portable utility wagon trailer is provided having a support frame connected to a single axle operatively connected to two opposing wheels. The support frame includes at least four low friction blocks mounted thereon. The portable utility wagon trailer includes a deck having a pair of opposing side rails disposed beneath the deck. Two of the low friction blocks operatively engages one side rail in a slidable arrangement, and the other two of the low friction blocks operatively engage the opposing side rail in a slidable arrangement. A spring biased locking pin removably engages an aperture defined by at least one side rail, for locking the deck in a fixed position for transport. The deck is configured to be collapsed by a user and then stood upright for storage.

4 Claims, 6 Drawing Sheets

(56) References Cited

U.S. PATENT DOCUMENTS

| | | | | |
|---|---|---|---|---|
| 6,789,829 | B1* | 9/2004 | Kapels | B62D 63/061 |
| | | | | 296/11 |
| 7,651,117 | B1* | 1/2010 | McGee | B62D 63/062 |
| | | | | 280/639 |
| 7,708,299 | B2* | 5/2010 | Duval | B60P 1/435 |
| | | | | 280/789 |
| 8,910,989 | B1* | 12/2014 | Boltz | B60G 3/14 |
| | | | | 280/656 |
| 2003/0155748 | A1* | 8/2003 | Picard | B62D 21/20 |
| | | | | 280/656 |
| 2006/0181063 | A1* | 8/2006 | Eddings | B62D 21/14 |
| | | | | 280/149.2 |
| 2009/0289438 | A1* | 11/2009 | Waddell | B62D 63/061 |
| | | | | 280/401 |
| 2022/0340219 | A1* | 10/2022 | Sinclair, III | B62D 63/061 |

* cited by examiner

EZ-Wagon Designs
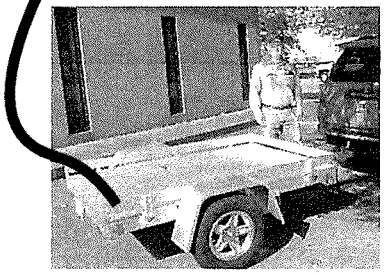
Deck
open position
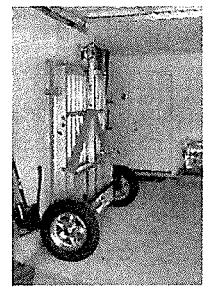
Closed position
FIG. 1
FIG. 2
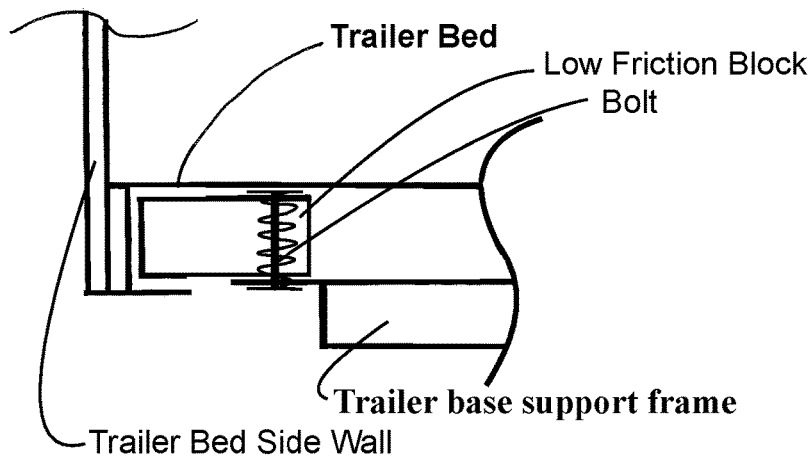
Trailer Bed
Low Friction Block
Bolt
Trailer base support frame
Trailer Bed Side Wall
BACK ELEVATION VIEW
(BACK LEFT PARTIAL VIEW)
FIG. 3

CITY WAGON

CROSS-REFERENCE TO RELATED APPLICATIONS

This application claims the benefit of priority of U.S. Provisional Application No. 63/134,915, filed Jan. 7, 2021, the disclosure of which is hereby incorporated by reference in its entirety.

BACKGROUND OF THE INVENTION

Field of the Invention

The present invention generally relates to portable trailer devices and more particularly relates to a small, collapsible vehicle utility trailer.

Description of the Related Art

Collapsible trailers are known in the art and are formed with a platform having a front portion and a rear portion. The back portion is pivotably coupled to the front platform portion so that the platform may fold upon itself. Each platform is mounted on a subframe which in turn is mounted through a leaf spring to an axle supported between the wheels. The subframe includes a flange forming an underhang extending from the front platform portion to beyond the pivot point of the back plates so that when the trailer is in the open position, i.e., the back platform portion is rotated away from the front platform portion, the underhang acts as a rotation stop and provides support for the back platform portion.

Conventional utility trailers suffer from several disadvantages. First, because the back platform portion is supported by a short flange of the subframe, the support in the trailer resides in the middle of the trailer, not at the far ends of the unfolded platforms so that when a large load such as a motorcycle is provided at the end of the back platform portion when loading, the flange rather than stopping the rotation of the back platform portion becomes a pivot for further rotation and the back platform portion breaks or shears from the subframe and front platform portion. Extending the underhang to provide greater support requires an inordinate amount of material such as steel tubing, adding weight to the trailer making the trailer difficult to tow and maneuver and making the entire trailer fuel inefficient. Secondly, by utilizing a leaf spring arrangement for the wheel support requires additional bars affixed to the subframe to provide connection points for the leaf spring, adding weight to the trailer.

Additionally, because all of the support for the front platform and back platform is provided at the center of the open platform, and there is no support at the extreme ends of the open platform, the platform is formed as a square with a substantially solid bedding below the rails further increasing the trailer's weight and moving the weight of the folded trailer away from the center towards the top of the trailer making the trailer extremely difficult to place in an upright position for storage. Conventional utility trailers may be suitable for the particular purpose employed, but they would not be as suitable for the purposes of the present invention as disclosed hereafter.

Accordingly, it is desirable to provide a collapsible and storable utility trailer providing support near the back and front of the open trailer while utilizing less material for lighter weight, ease of manufacture and fuel efficiency.

One object of the embodiments of the disclosed invention is to provide a portable, collapsible and storable utility trailer that allows easy, efficient, and safe maneuvering as well as convenient storage at various destinations and locations.

As disclosed in this application, the inventor has discovered novel and unique devices and methods for portable and efficient transport, maneuvering, and storage of collapsible utility trailers, which exhibit superlative properties without being dependent on heavy, immobile, expensive or complex components.

Embodiments of the present invention provide for devices and methods disclosed herein and as defined in the annexed claims which provide for improved transport and storage features in order to efficiently maneuver, utilize and store small utility trailers in a safe and convenient manner, for people's enjoyment.

SUMMARY OF THE INVENTION

It is one prospect of the present invention to provide one or more novel devices of simple but effective construction which can be applied to many vehicles to portably, efficiently, and effectively transport, collapse and store utility trailers at multiple destinations.

The following presents a simplified summary of the present disclosure in a simplified form as a prelude to the more detailed description that is presented herein.

Therefore, in accordance with embodiments of the invention, there is provided a portable, collapsible utility trailer having a support frame connected to an axle and at least one opposing pair of wheels operatively connected to the axle for supporting the collapsible utility trailer in an extended transport position.

The collapsible utility trailer includes a deck having a first side rail opposite a second side rail. The first side rail and the second side rail are disposed beneath the deck, and the deck disposed above the support frame.

In a preferred embodiment, the collapsible utility trailer includes at least four low friction blocks mounted atop the support frame. Preferably, at least two of the at least four low friction blocks operatively engages the first side rail in a slidable arrangement. Moreover, at least two of the at least four low friction blocks operatively engages the second side rail in a slidable arrangement.

The collapsible utility trailer includes at least one spring biased locking pin mounted to the support frame. The locking pin is configured to operatively engage at least one locking aperture defined by the first side rail, at the option of the user. Upon engagement of the spring biased locking pin into said at least one locking aperture, the deck is fixed in the extended transport position adapted for transportation. Upon removal of the engagement of said spring biased locking pin from the at least one locking aperture, the deck is slidable against the low friction blocks into a collapsed storage position.

In one embodiment, the deck includes a front deck end opposite a back deck end, and the back deck end terminates at a back deck end plane that is perpendicular to a longitudinal axis of the deck. The support frame comprises a front frame end opposite a back frame end, and the back frame end terminates at a back frame end plane that is perpendicular to a longitudinal axis of the support frame. In the collapsed storage position, the back deck end plane is in coplanar alignment with the back frame end plane. In the collapsed storage position, the collapsible utility trailer can be tilted upright to a freestanding position for storage in a compact manner.

In another embodiment, the first side rail defines at least a second locking aperture, and the spring biased locking pin is adapted to engage the at least second locking aperture in the collapsed storage position.

In yet another embodiment, the collapsible utility trailer further includes at least a second opposing pair of wheels operatively connected to a second axle connected to the support frame.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which:

FIG. 1 is back left perspective view of a portable city wagon removably connected to a receiver hitch of an exemplary vehicle, in accordance with embodiments of the invention;

FIG. 2 is a left perspective view of a portable city wagon stored in an upright storage position in accordance with embodiments of the invention;

FIG. 3 is a partial back left elevation view of a portable city wagon, in accordance with embodiments of the invention;

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

Referring initially to FIGS. 1-4, the basic constructional details and principles of operation of embodiments of a portable, collapsible utility wagon trailer 100 (hereinafter "collapsible utility trailer") according to preferred embodiments of the present invention will be discussed.

In FIG. 1, there is provided the collapsible utility trailer removably connected to an exemplary vehicle. The collapsible utility trailer includes a support frame connected to an axle and includes at least one opposing pair of wheels operatively connected to the axle for supporting the collapsible utility trailer in an extended transport position.

The collapsible utility trailer includes a deck having a first side rail opposite a second side rail. The first side rail and the second side rail are disposed beneath the deck, and the deck disposed above the support frame. In a preferred embodiment, the width of the deck is at least fifty (50) inches wide, and the length of the deck is at least seventy-four (74) inches long.

Figure 4:
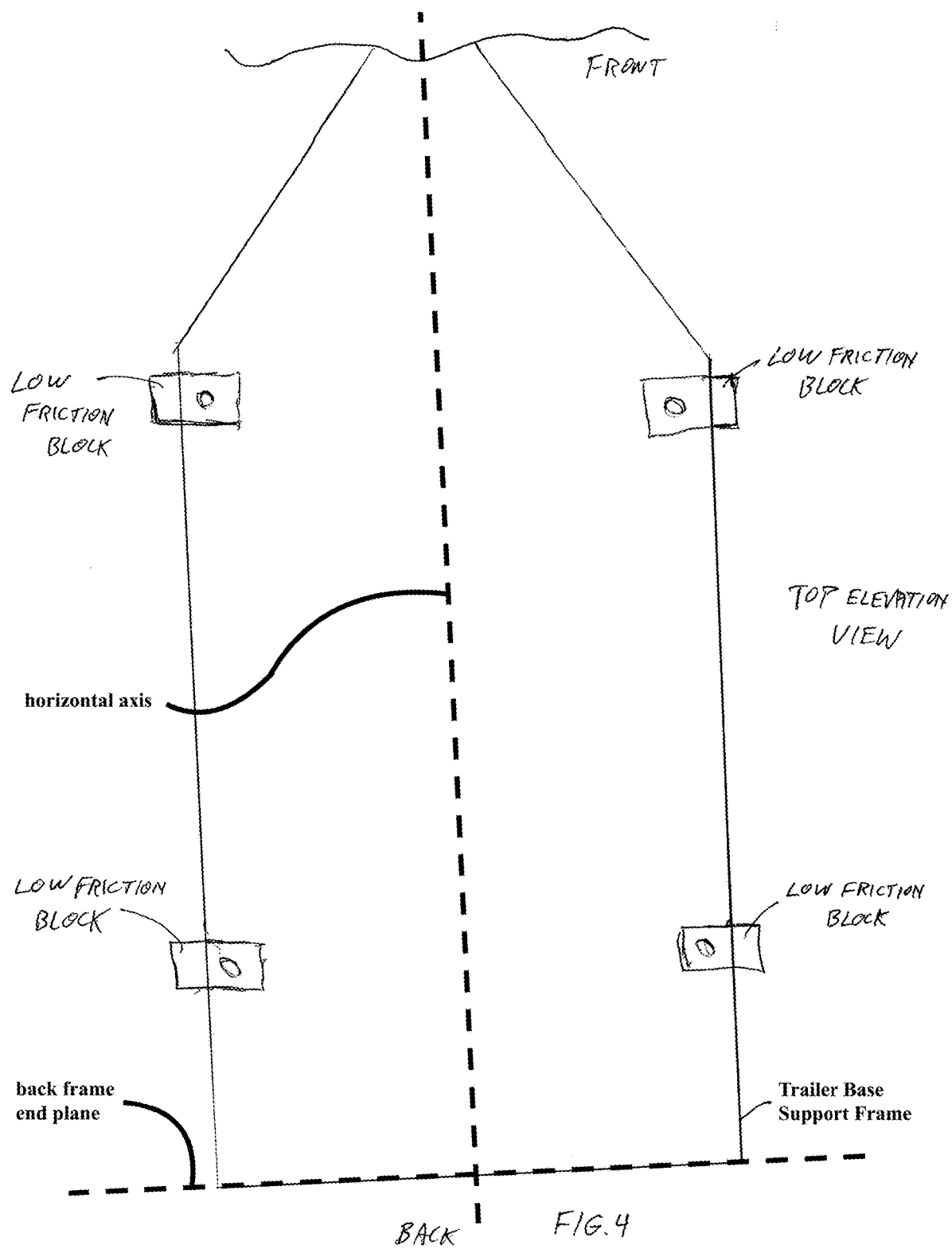
FIG. 4 partial top elevation view of a portable city wagon, in accordance with embodiments of the invention.
Figure 7:
FIG. 7 is a partial bottom perspective view of a portable city wagon, in accordance with embodiments of the invention.
Figure 8:
FIG. 8 is a back left perspective view of a portable city wagon with exemplary cargo removably connected to a receiver hitch of an exemplary vehicle, in accordance with embodiments of the invention.

Referring to FIGS. 3, 4 and 7, in a preferred embodiment, the collapsible utility trailer includes at least four low friction blocks mounted atop the support frame. Preferably, at least two of the at least four low friction blocks operatively engages the first side rail in a slidable arrangement. Moreover, at least two of the at least four low friction blocks operatively engages the second side rail in a slidable arrangement. In such manner, the deck is slidable (along a horizontal axis) relative to the support frame, such that the deck can slide from an extended transport position, as illustrated in FIGS. 1 and 8, to a collapsed storage position, as illustrated in FIGS. 2 and 5.

Referring to FIG. 7, the collapsible utility trailer includes at least one spring biased locking pin mounted to the support frame. The locking pin is configured to operatively engage at least one locking aperture defined by the first side rail, at the option of the user. Upon engagement of the spring biased locking pin into said at least one locking aperture, the deck is fixed in the extended transport position adapted for transportation. Upon removal of the engagement of said spring biased locking pin from the at least one locking aperture, the deck is slidable against the low friction blocks into a collapsed storage position.

In one embodiment, the deck includes a front deck end opposite a back deck end, and the back deck end terminates at a back deck end plane that is perpendicular to a longitudinal axis of the deck. The support frame comprises a front frame end opposite a back frame end, and the back frame end terminates at a back frame end plane that is perpendicular to a longitudinal axis of the support frame. In the collapsed storage position, the back deck end plane is in coplanar alignment with the back frame end plane.

Figure 5:
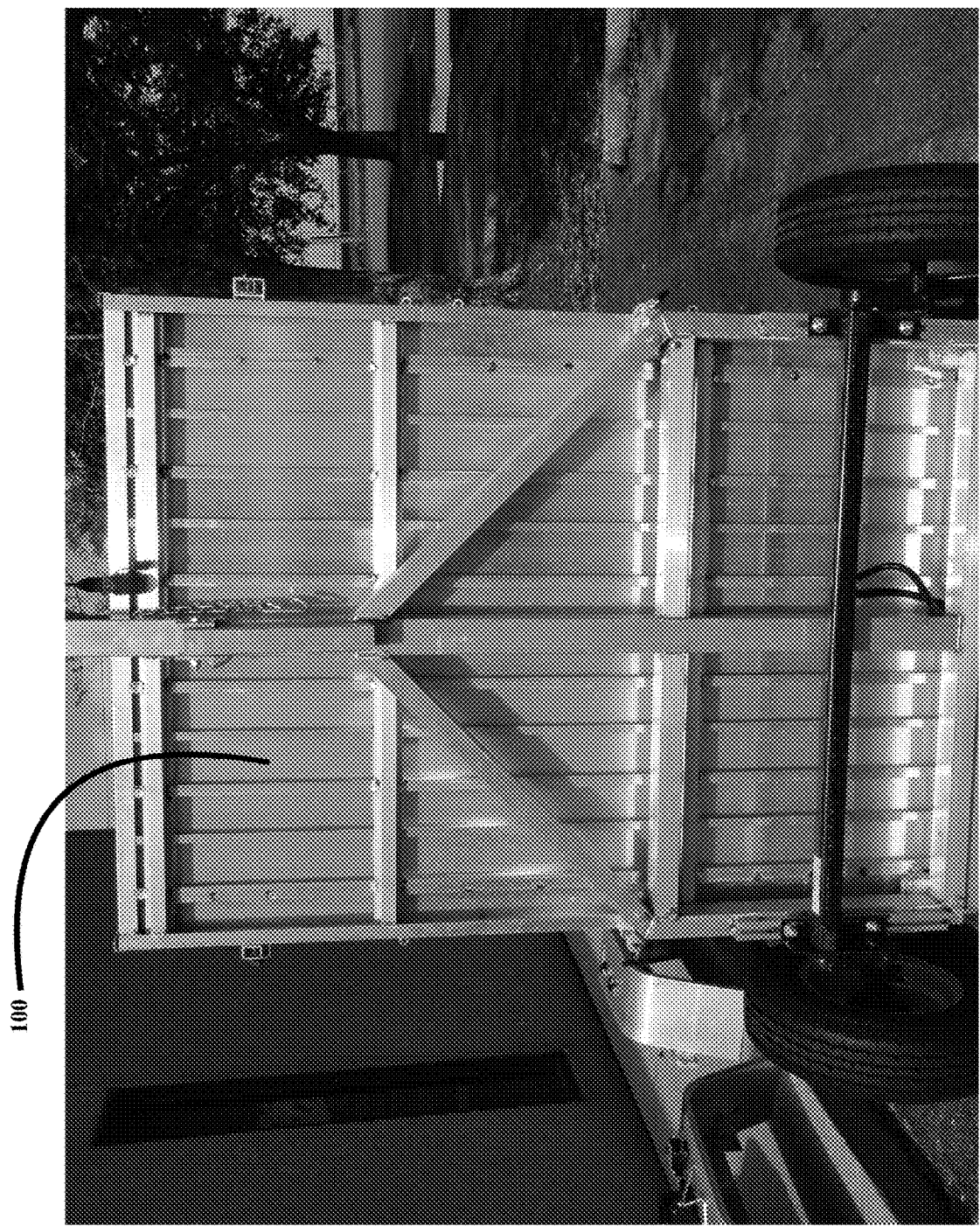
FIG. 5 is a bottom perspective view of a portable city wagon in an upright storage position, in accordance with embodiments of the invention.
Figure 6:
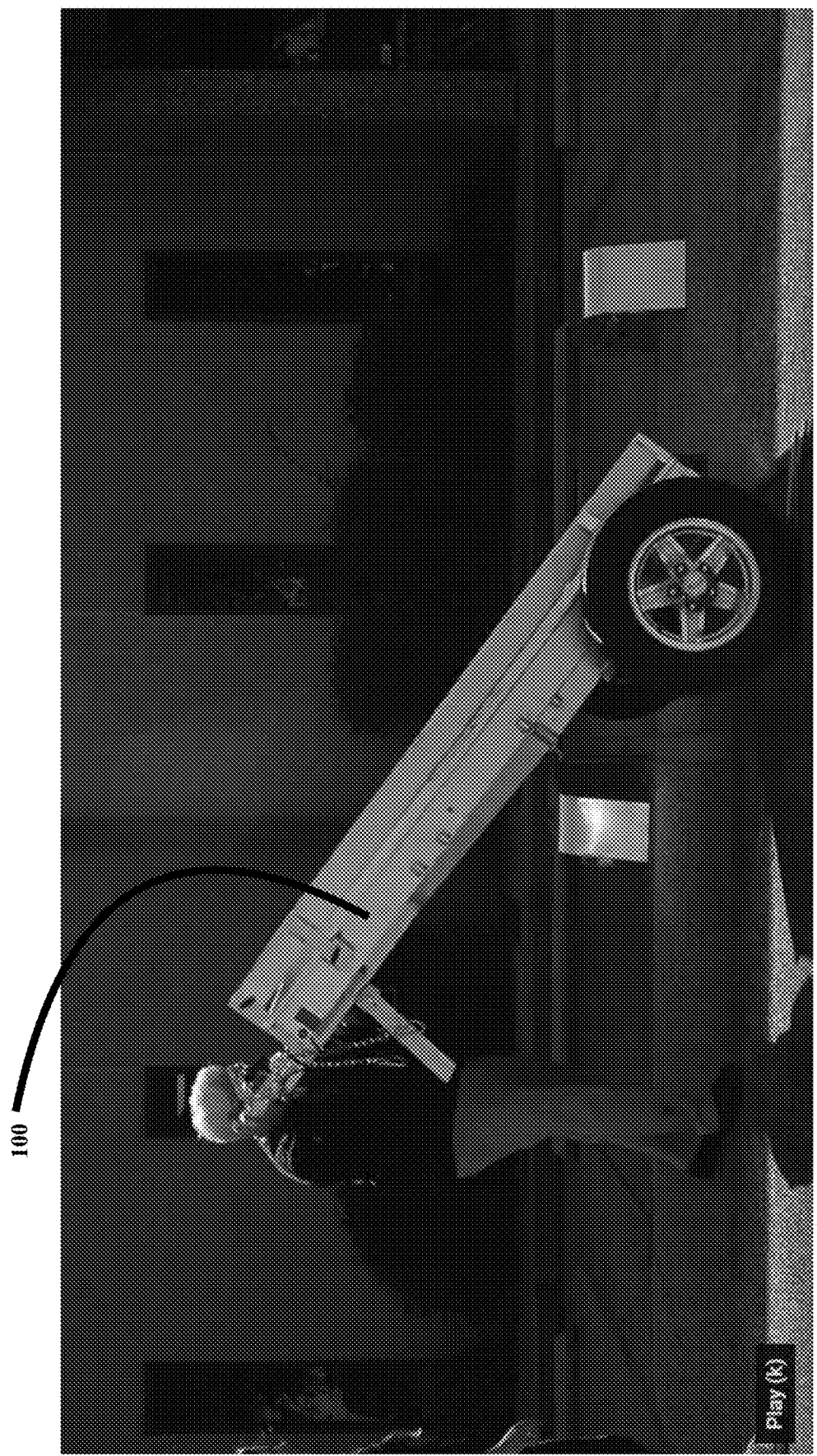
FIG. 6 is a right side elevation view of a portable city wagon illustrated as being lifted from a transport position to an upright storage position, in accordance with embodiments of the invention.

In the collapsed storage position, the collapsible utility trailer can be tilted upright, as illustrated in FIG. 6, to a freestanding position for storage in a compact manner, as illustrated in FIG. 5. In the collapsed storage position, the deck is disposed over the tongue of the collapsible utility trailer and the pair of wheels are exposed in the rear, allowing the collapsible utility trailer to pivot upward into the freestanding position where the collapsible utility trailer is adapted to be rolled into a storage spot, at the option of the owner user.

In another embodiment, the first side rail defines at least a second locking aperture, and the spring biased locking pin is adapted to engage the at least second locking aperture in the collapsed storage position.

In yet another embodiment, the collapsible utility trailer further includes at least a second opposing pair of wheels operatively connected to a second axle connected to the support frame.

It can be appreciated from the invention disclosed herein that the collapsible utility trailer is towable by a vehicle as a common small utility trailer.

In one embodiment, the collapsible utility trailer compresses into the area between the rear portion of the wheels and the front of the ball hitch. This allows the collapsible utility trailer to stand up on its wheels and be put away utilizing a small footprint on the ground or in a garage or any other storage building. Moreover, in such embodiment, the collapsible utility trailer does not require any hinges, telescoping tubing, or rollers which could become corroded, dirty, or otherwise likely to break or become stuck as the trailer ages.

In one embodiment, the base or support frame of the collapsible utility trailer and the bed are made in two separate pieces. In such embodiment, the base is designed such that there will be several support bars running from to back connecting to cross supports on both front and back. The back support will be even with the rear portion of the wheels allowing the base to stand on the wheels without the rear support hitting the ground before the trailer is fully upright.

In one embodiment, on top of the base, running front to back, supports will be fixed flat runners, which are fabricated with high density polymer materials, having smooth low friction surfaces such as, but not limited to polyethylene. In such embodiment, there are spaces between the sheets of the polymer runners to allow room for supports and guided from the sliding bed or deck.

The sliding bed or deck is designed around a solid sheet of the same type of polymer which will ultimately be resting directly upon the runners attached to the trailer base. The compressing action of the trailer can happen as the separate bed deck will slide forward on top of the runners far enough so that the rear of the sliding bed deck is even with or slightly forward of the back of the wheels, once again allowing the trailer to stand into a vertical position without being obstructed by the bed. The polymer sheet of the bed will be supported by a metal framework around all four sides with additional interior supports place so that they fit between the gaps of the runners on the base. In this manner, the support frame will also double as a guide to keep the bed deck sliding in a straight direction and keep it from slipping from side to side.

In one embodiment, there will also be metal "stops" attached to the underside of the bed deck that will be either hooked or pinned to the frame of the base, to hold the bed deck in place, either forward for storage, or back for use during transportation.

Preferably, the bed deck has a low profile frame on all four sides. Such frame will accommodate special stakes that can be temporarily attached to the sides of the trailer and provide for a variety of attachments making the collapsible utility trailer even more versatile than conventional trailers. The fenders/wheel covers will also be attached to stakes so that they can be removed for storage.

A standard trailer light system will be attached to the trailer bed deck and/or to the wheel covers.

Preferably, the collapsible utility trailer includes a suspension that is a single axle attached to the base support frame. In another embodiment, the suspension includes separate independent rubber torch system attached to either side of the base.

Thus, embodiments of the disclosed invention provide for portable and efficient utility, as the collapsible utility trailer 100 is lightweight and portable and exhibits superlative properties, without being dependent on heavy, immobile, expensive or complex components.

Accordingly, as can be appreciated from the descriptions and illustrations herein, embodiments of the disclosed invention provide improved utility trailer transport and storage features in order to efficiently maneuver, utilize, transport, and store small utility trailers in a safe and convenient manner, for people's enjoyment.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

All U.S. patents and publications identified herein are incorporated in their entirety by reference thereto.

The claimed invention is:

1. A collapsible utility trailer comprising:
    a support frame connected to an axle;
    at least one opposing pair of wheels operatively connected to the axle for supporting the collapsible utility trailer in an extended transport position;
    a deck having a first side rail opposite a second side rail, wherein the first side rail and the second side rail are disposed beneath the deck, the deck disposed above the support frame;
    at least four low friction blocks mounted atop the support frame, wherein at least two of the at least four low friction blocks operatively engages the first side rail in a slidable arrangement, wherein at least two of the at least four low friction blocks operatively engages the second side rail in a slidable arrangement;
    at least one spring biased locking pin mounted to the support frame, said locking pin configured to operatively engage at least one locking aperture defined by the first side rail, at the option of the user, wherein upon engagement of said spring biased locking pin into said at least one locking aperture, the deck is fixed in the extended transport position adapted for transportation, wherein upon removal of said engagement of said spring biased locking pin from said at least one locking aperture, the deck is slidable against the low friction blocks into a collapsed storage position.

2. The collapsible utility trailer of claim 1, wherein the deck comprises a front deck end opposite a back deck end, wherein the back deck end terminates at a back deck end plane that is perpendicular to a longitudinal axis of the deck, wherein the support frame comprises a front frame end opposite a back frame end, wherein the back frame end terminates at a back frame end plane that is perpendicular to a longitudinal axis of the support frame, wherein in the collapsed storage position the back deck end plane is in coplanar alignment with the back frame end plane.

3. The collapsible utility trailer of claim 1, wherein the first side rail defines at least a second locking aperture, wherein the spring biased locking pin is adapted to engage said at least second locking aperture in the collapsed storage position.

4. The collapsible utility trailer of claim 1, further comprising at least a second opposing pair of wheels operatively connected to a second axle connected to the support frame.

* * * * *